(12) United States Patent
Takase

(10) Patent No.: US 6,661,551 B2
(45) Date of Patent: Dec. 9, 2003

(54) OPTICAL SCANNER

(75) Inventor: Yoshiyuki Takase, Saitama (JP)

(73) Assignee: Fuji Photo Optical Co., Ltd., Saitama (JP)

(*) Notice: Subject to any disclaimer, the term of this patent is extended or adjusted under 35 U.S.C. 154(b) by 0 days.

(21) Appl. No.: 10/105,402

(22) Filed: Mar. 26, 2002

(65) Prior Publication Data

US 2002/0141025 A1 Oct. 3, 2002

(30) Foreign Application Priority Data

Mar. 27, 2001 (JP) .................................. 2001-089691

(51) Int. Cl.[7] ............................................. G02B 26/08
(52) U.S. Cl. ...................... 359/206; 359/216; 359/212
(58) Field of Search ............................... 359/196–226, 359/811, 819, 827; 347/241–244, 256–261, 263

(56) References Cited

U.S. PATENT DOCUMENTS 4,847,644 A * 7/1989 Oda et al. .................... 359/216
5,257,138 A * 10/1993 Yamaguchi et al. ......... 359/819
5,506,719 A * 4/1996 Murakami et al. .......... 359/216
5,625,482 A * 4/1997 Sugiura ....................... 359/216

FOREIGN PATENT DOCUMENTS

JP    A 11-258532    9/1999

* cited by examiner

Primary Examiner—James Phan
(74) Attorney, Agent, or Firm—Oliff & Berridge, PLC

(57) ABSTRACT

An optical scanner comprises a light source, a reflection mirror, deflection device, and an f·θ lens fixed to a plate-shaped bracket. The optical scanner is characterized in that a luminous flux emitted from the light source is guided to the deflection device by the reflection mirror and the luminous flux deflected by the deflection device is guided to the f·θ lens, a light source optical path from the light source to the reflection mirror is arranged to be tilted with respect to a plane which is drawn by an optical axis of a scanning optical path led to the f·θ lenses deflected by the deflection device, and the light source optical path is arranged on one side across the plane drawn by the optical axis of the scanning optical path, and the plate-shaped bracket of the f·θ lens is arranged on the other side.

6 Claims, 5 Drawing Sheets

OPTICAL SCANNER

BACKGROUND OF THE INVENTION

1. Technical Field

The present invention relates to an optical scanner for allowing a laser beam emitted from a light source to cross an f·θ lens in a copying machine, a laser printer, or the like. In particular, the invention relates to a technique for preventing a plate-shaped bracket of an f·θ lens assembly from interfering with a laser beam emitted from the light source.

2. Related Art

Conventionally, as disclosed in Japanese Patent Application Laid-Open No. 11-258532 (1999), in a copying machine, a printer, or the like in which a laser beam is scanned so as to form an image, a machine, in which laser beam is emitted from a light source is allowed to cross an axial line of an f·θ lens so that its structure can be made compact, is known. FIG. 5 shows one example of an optical scanner to be used in such a copying machine or the like. In the optical scanner shown in this drawing, a laser beam La emitted from a light source 1 such as a laser diode is transmitted through a collimating lens 2 so as to be formed into a parallel light beam and is formed into a linear spot by a cylindrical lens 3. Thereafter, the beam passes through between a pair of f·θ lenses 6 from below and is reflected by a first reflection mirror 4 so as to enter a rotatable polyhedral mirror 5. The laser beam La, which is deflected by the rotatable polyhedral mirror 5 which rotates at a constant speed, is transmitted between the paired f·θ lenses 6, and is reflected by a second reflection mirror 7 and a third reflection mirror 8 so as to form an image on a scanning surface 9. In this case, the f·θ lenses 6 have a function for making the moving speed of an imaging position in a horizontal direction on the scanning surface 9 to be constant.

In the optical scanner, in order to prevent occurrence of so-called "ghosting" in an image, an optical axis is generally tilted in an up-and-down direction. In other words, in the optical scanner shown in FIG. 5, the laser beam La emitted from the light source 1 is acclivitous, a laser beam Lb reflected by the first reflection mirror 4 is declivitous, a laser beam Lc reflected by the rotatable polyhedral mirror 5 is declivitous, and laser beams Ld and Le reflected by the second and third reflection mirrors 7 and 8 are declivitous.

The f·θ lenses 6 are conventionally fixed to a bottom plate of a housing of a copying machine, for example, by bonding. However, if defects occur in the f·θ lenses 6 or another arrangements, the entire copying machine should be discarded. For this reason, in recent years, the f·θ lenses 6 are fixed to the plate-shaped bracket to be a sub-assembly so that when a defect occurs in the f·θ lenses 6, only the sub-assembly of the f·θ lenses 6 need be discarded. More specifically, the f·θ lenses 6 are bonded to an upper surface of the plate-shaped bracket, and the plate-shaped bracket is fixed to the bottom plate of the housing by a screw.

However, an up-and-down distance between the laser beam La emitted from the light source 1 and the laser beam Lc passing through the lower side between the f·θ lenses 6 is set to be fairly short in order to reduce the thickness of the device. Since the laser beam La is tilted, its optical path is interfered with by the plate-shaped bracket for supporting the f·θ lenses 6, and thus there arises problems in that the laser beam La does not form an image on the scanning surface 9 or even if it does form an image, an electrostatic latent image is not formed.

SUMMARY OF THE INVENTION

It is an object of the present invention to prevent a plate-shaped bracket of an f·θ lens assembly from interfering with a laser beam emitted from a light source in an optical scanner in which the laser beam emitted from the light source is allowed to cross an f·θ lens.

The present invention provides an optical scanner comprising a light source, a reflection mirror, deflection device, and an f·θ lens fixed to a plate-shaped bracket. The optical scanner is characterized in that a luminous flux emitted from the light source is guided to the deflection device by the reflection mirror and the luminous flux deflected by the deflection device is guided to the f·θ lens, a light source optical path from the light source to the reflection mirror is arranged to be tilted with respect to a plane which is drawn by an optical axis of a scanning optical path led to the f·θ lenses deflected by the deflection device, and the light source optical path is arranged on one side across the plane drawn by the optical axis of the scanning optical path, and the plate-shaped bracket of the f·θ lens is arranged on the other side.

According to the optical scanner having the above structure, since the light source optical path from the light source to the reflection mirror is arranged on one side across the location drawn by the optical axis of the scanning optical path and the plate-shaped bracket of the f·θ lens is arranged on the other side, the plate-shaped bracket is separated from the light source optical path and does not interfere with it.

As mentioned above in the present invention, the f·θ lens is fixed to another plate-shaped bracket which is not used for the housing of the optical scanner so as to be constituted as the f·θ lens assembly (subassembly). In a preferable form of the present invention, the light source, the reflection mirror, and the deflection device are provided in the housing, and the plate-shaped bracket is attached to the bottom surface of the housing with an interval. In this case, a luminous flux emitted from the light source has an acclivity with respect to the bottom surface of the housing, and the f·θ lenses are fixed to the lower surface of the plate-shaped bracket. This provides an advantage in that the upper side of the f·θ lens is covered by the plate-shaped bracket and dust hardly adheres to the f·θ lens. Moreover, when the upper side of the f·θ lens is covered by the plate-shaped bracket, it appears that the lens is housed in the housing, thereby providing a compact structure. Therefore, the functions are diversified in such a manner that a harness for wiring is allowed to pass through the upper surface of the plate-shaped bracket or other parts are attached.

More specifically, the plate-shaped bracket is attached to a boss which stands on the bottom surface of the housing by a screw, and a space is provided between the plate-shaped bracket and the bottom surface of the housing. Moreover, two f·θ lenses, for example, are fixed to the lower surface of the plate-shaped bracket by a device such as bonding, and a luminous flux such as a laser beam emitted from the light source crosses between the f·θ lenses from the top view, for example, at the lower side of the plate-shaped bracket. The present invention can be applied to the case of one f·θ lens, and this includes the case where a luminous flux crosses the f·θ lens from the top view and the case where the luminous flux crosses front or rear positions of the f·θ lens.

DETAILED DESCRIPTION OF THE PREFERRED EMBODIMENT

A. Structure of the Embodiment

Figure 1:
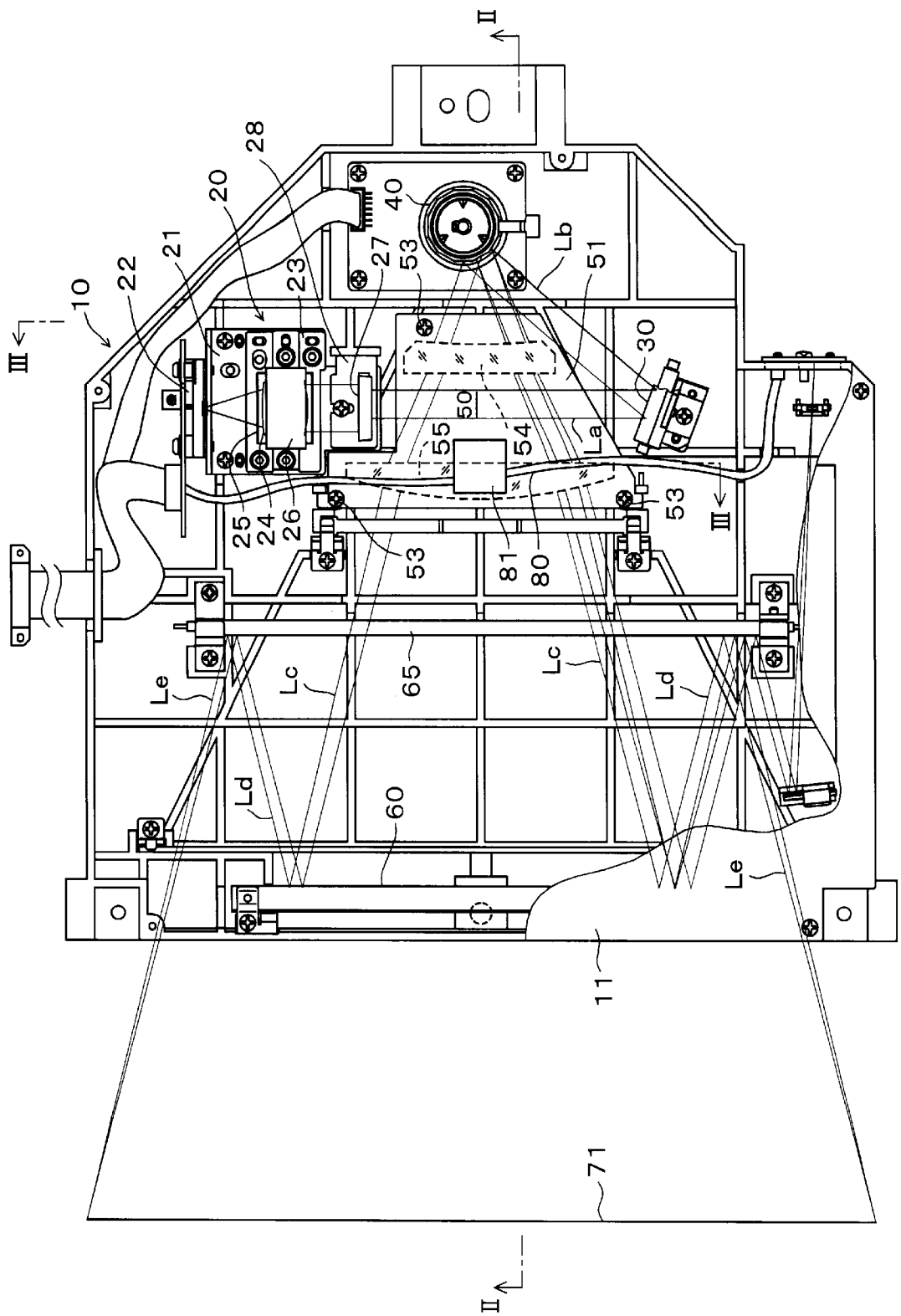
FIG. 1 is a plan view showing an optical scanner according to an embodiment of the present invention.
Figure 2:
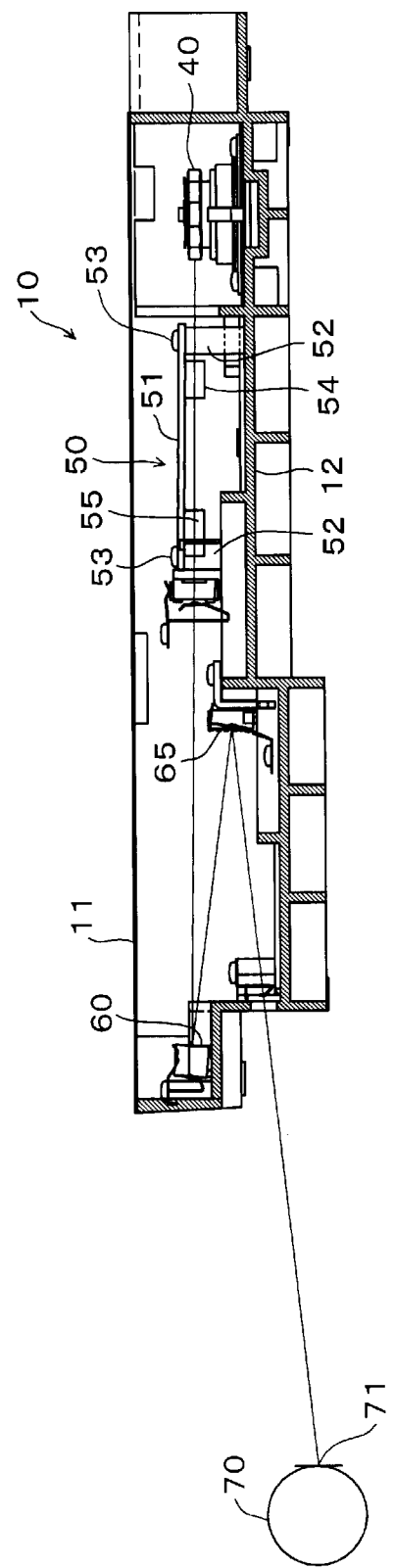
FIG. 2 is a cross sectional view taken along line II—II in FIG. 1.
Figure 3:
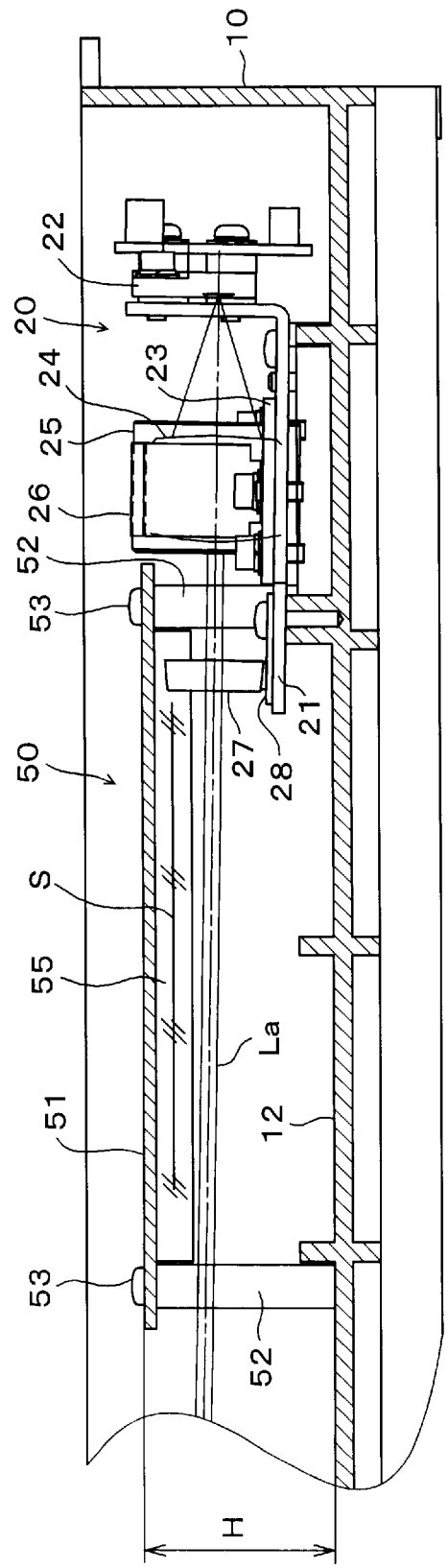
FIG. 3 is a cross sectional view taken along line III—III in FIG. 1.

An embodiment of the present invention will be explained below with reference to FIGS. 1 through 3. FIG. 1 is a plan view showing an optical scanner according to the embodiment. In the following explanation, the left side of FIG. 1 is a front end side and this defines front-and-rear and right-and-left directions from the top view. In FIG. 1, reference numeral 10 is a housing to form a main body of the optical scanner, and 11 is an upper cover. A right rear end portion of the housing 10 is provided with a light source section (light source) 20.

Reference numeral 21 in this drawing is a holder to be a main body of the light source section 20, and the holder 21 is obtained by molding a cold-rolled steel plate into an L-shape from a side view. A laser generating section 22 which contains a laser diode (not shown) is attached to a portion on a right end of the holder 21 which rises vertically. A supporting plate 23, which is obtained by molding a cold-rolled steel plate, is supported to the holder 21 slidably to a right-and-left direction, and a mirror body 25 having a collimating lens 24 is elastically fixed to the supporting plate 23 in a tightened state by a plate spring 26. Moreover, a plate 28 to which a cylindrical lens 27 is fixed is attached to a left end portion of the holder 21. The collimating lens 24 forms a laser beam (luminous flux) emitted from the laser diode into a parallel light beam, and the cylindrical lens 27 forms the laser beam into a linear spot.

A first reflection mirror (reflection mirror) 30 is attached to the opposite side to the light source section 20, and the first reflection mirror 30 reflects a laser beam La emitted from the light source section 20 to a rotatable polyhedral mirror (deflection device) 40 arranged on a center rear end of the housing 10. An f·θ lens assembly 50 is arranged between the light source section 20 and the first reflection mirror 30. In the drawing, reference numeral 51 is a plate-shaped bracket, and it is attached to a bottom plate 12 of the housing 10 via a cylindrical boss 52 by a screw 53. Two f·θ lenses 54 and 55, of which axial lines intersect perpendicularly to the laser beam La from the top view, are bonded to a lower surface of the plate-shaped bracket 51 so as to be separated from each other in a front-and-rear direction.

The f·θ lenses 54 and 55 have a function for making a moving speed of an imaging position on a scanning surface 71 of a photosensitive drum 70 (described below) in a horizontal direction to be constant. As shown in FIG. 1, the laser beam La emitted from the light source section 20 passes through between the f·θ lenses 54 and 55. Moreover, as shown in FIG. 3, the laser beam La is tilted so as to be slightly acclivitous to the left side, and passes a position just below a lower left edge portion of the f·θ lens 55 (54) from the side. This allows a plane S, which is drawn by an optical axis of a scanning optical path deflected and scanned by the rotatable polyhedral mirror 40 and transmitted through the f·θ lenses 54 and 55, to be positioned in the middle portion between the laser beam La and the plate-shaped bracket 51.

A second reflection mirror 60 extending in the right-and-left direction is arranged on a front end portion of the housing 10. The second reflection mirror 60 reflects the laser beam Lc transmitted through the f·θ lenses 54 and 55 towards the rear end side, that is, in a declivitous direction. A third reflection mirror 65 which is extended in the right-and-left direction is arranged in the middle portion of the housing 10 in the front-and-rear direction. The third reflection mirror 65 is arranged in a position which is below the second reflection mirror 60 by one step, and the laser beam Lc passes above the third reflection mirror 65. Moreover, the third reflection mirror 65 reflects the laser beam Ld reflected by the second reflection mirror 60 toward the front end side, that is, in the declivitous direction. The reflected laser beam Le forms an image on the scanning surface 71 of the photosensitive drum 70 arranged in the farther front side than the housing 10.

B. Functions of the Embodiment

There will be explained below the functions of the optical scanner having the above structure. Firstly, the laser beam emitted from the laser generating section 22 is transmitted through the collimating lens 24 so as to be formed into a parallel light beam, and is transmitted through the cylindrical lens 27 so as to be formed into a linear spot. The laser beam La emitted from the light source section 20 in such a manner enters the first reflection mirror 30. As shown in FIG. 3, the laser beam La has a slightly acclivity and passes through a position just below the lower left edge of the f·θ lens 55 (54) from the side. Therefore, the plate-shaped bracket 51 does not interfere with the laser beam La.

Figure 4:
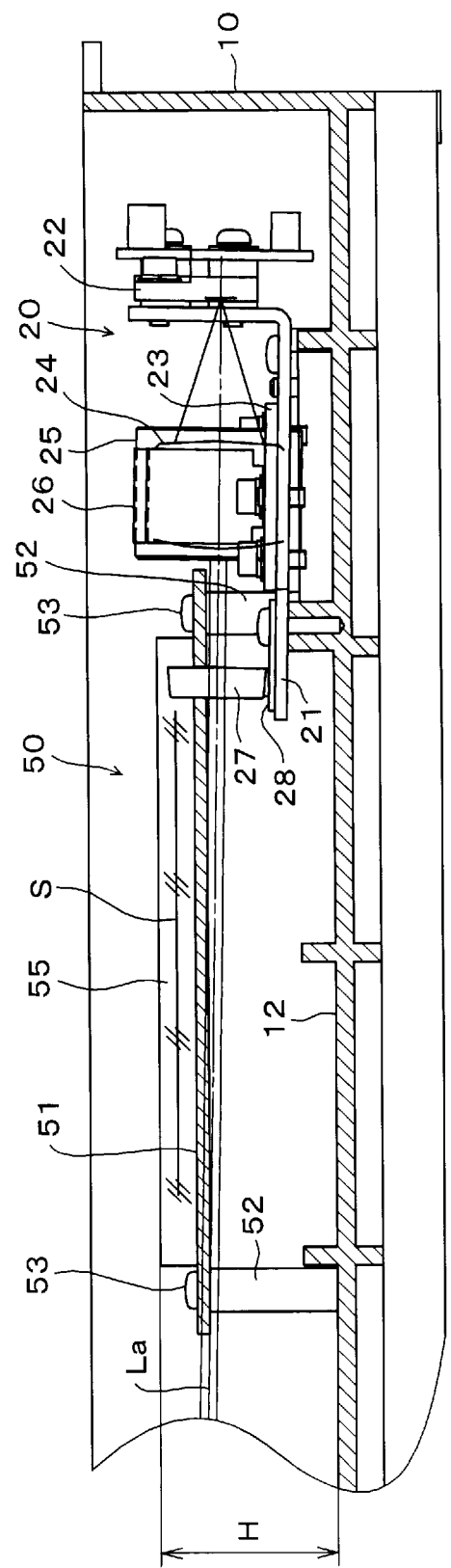
FIG. 4 is a diagram showing a state in which f·θ lenses are fixed onto an upper surface of a frame in FIG. 3.
Figure 5:
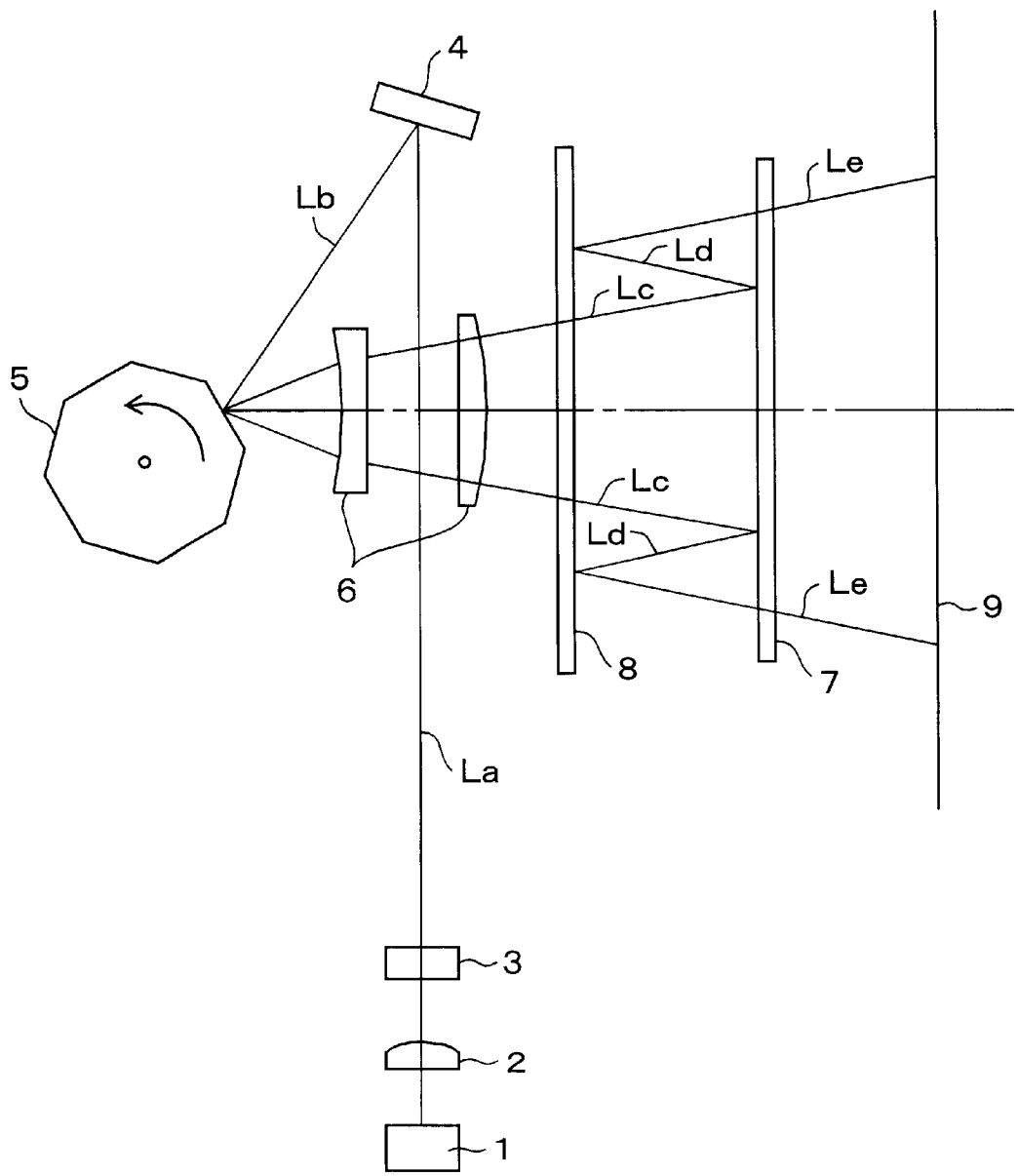
FIG. 5 is a schematic diagram showing a conventional optical scanner.

There will be explained below the case where the f·θ lens 55 is fixed to the upper surface of the plate-shaped bracket 51 in FIG. 3 with reference to FIG. 4. A height H of the f·θ lens assembly 50 from the bottom plate 12 of the housing 10 shown in FIG. 4 is equivalent to that shown in FIG. 3. As is clear from FIG. 4, an upper half of the laser beam La is shielded by the lower left edge portion of the f·θ lens 55. Therefore, in this case, an electrostatic latent image cannot be formed on the scanning surface 71. In contrast, in FIG. 3 of the present embodiment, since the laser beam La is widely separated from the plate-shaped bracket 51, the laser beam La is not blocked, and furthermore the height of the f·θ lens assembly 50 is further lowered so the structure can be compact.

The laser beam La is reflected by the first reflection mirror 30 without any interference and enters the rotatable polyhedral mirror 40 as the slightly declivitous laser beam Lb. The laser beam Lc reflected by the rotatable polyhedral mirror 40 is transmitted through the f·θ lenses 54 and 55 with the laser beam Lc being slightly declivitous so as to enter the second reflection mirror 60. The laser beam Ld reflected by the second reflection mirror 60 enters the third reflection mirror 65 with the laser beam Ld having a relatively large declivity, and the laser beam Le reflected by the third reflection mirror 65 enters the scanning surface 71 of the photosensitive drum 70 with the laser beam Le having a relatively large declivity so as to form an image thereon. Since the rotatable polyhedral mirror 40 rotates with an uniform speed, when a light reflected therefrom enters a linear surface from the top view, it does not move to the incident position at a uniform speed. The f·θ lenses 54 and 55 make the speed of the movement to the incident position constant. In the present embodiment, two f·θ lenses 54 and 55 are used, but as described in Japanese Patent Application Laid-Open No. 11-258532 (1999), a structure in which one f·θ lens is used and a laser beam is emitted from a light source section crosses the f·θ lens can be applied to the present invention.

In the optical scanner according to the present embodiment, since the laser beam La which moves from the light source section 20 to the first reflection mirror 30 is arranged on one side across the plane S which is drawn by the optical axis of the scanning optical path by the rotatable polyhedral mirror 20 and the plate-shaped bracket 51 of the f·θ lenses 54 and 55 is arranged on the other side, the plate-shaped bracket 51 is separated from the laser beam La so as not to interfere with the laser beam La.

In particular, in the above embodiment, since the f·θ lenses 54 and 55 are attached to the lower surface of the plate-shaped bracket 51, the upper sides of the f·θ lenses 54 and 55 are covered by the plate-shaped bracket 51, and this provides an advantage that dust hardly adheres to the f·θ lenses 54 and 55. Moreover, as shown in FIG. 1, since the plate-shaped bracket 51 exists on the upper surface of the f·θ lens assembly 50, the structure is compact. In this embodiment, as shown in FIG. 1, a hardness 80 for wiring is put through the upper surface of the plate-shaped bracket 51, and it can be fixed to the plate-shaped bracket 51 by a fixing tool 81.

What is claimed is:

1. An optical scanner comprising a light source, a reflection mirror, a deflection device, and an f·θ lens fixed to a plate-shaped bracket, wherein:
   a luminous flux emitted from the light source is guided to the deflection device by the reflection mirror and the luminous flux deflected by the deflection device is guided to the f·θ lens;
   a light source optical path from the light source to the reflection mirror is arranged to be tilted with respect to a plane which is drawn by an optical axis of a scanning optical path led to the f·θ lens deflected by the deflection device; and
   the light source optical path is arranged on a lower side across the plane drawn by the optical axis of the scanning optical path and the plate-shaped bracket of the f·θ lens is arranged on an upper side.

2. The optical scanner according to claim 1, wherein a housing is provided with the light source, the reflection mirror and the deflection device, the plate-shaped bracket is attached to a bottom surface of the housing so as to be separated from each other, the luminous flux emitted from the light source has an acclivity with respect to the bottom surface, and the f·θ lens is fixed to a lower surface of the plate-shaped bracket.

3. The optical scanner according to claim 2, wherein the f·θ lens is fixed to another plate-shaped bracket which is not used for the housing of the optical scanner so as to be constituted as the f·θ lens assembly.

4. The optical scanner according to claim 3, wherein the plate-shaped bracket is attached to a bottom surface of the housing with an interval, the f·θ lens is fixed to the lower surface of the plate-shaped bracket.

5. The optical scanner according to claim 4, wherein the plate-shaped bracket is attached to bosses which stand on the bottom surface of the housing, a pair of the f·θ lenses is fixed to a lower surface of the plate-shaped bracket, and a luminous flux emitted from the light source crosses between the f·θ lenses viewed from the top view at the lower side of the plate-shaped bracket.

6. The optical scanner according to claim 4, wherein the plate-shaped bracket is attached to bosses which stand on the bottom surface of the housing, a f·θ lenses is fixed to a lower surface of the plate-shaped bracket, and a luminous flux emitted from the light source crosses the f·θ lenses or front or rear positions of the f·θ lens viewed from the top view at the lower side of the plate-shaped bracket.

* * * * *